(12) United States Patent
Weinzierl et al.

(10) Patent No.: US 7,107,370 B2
(45) Date of Patent: Sep. 12, 2006

(54) WIRELESS COMMUNICATION PORTFOLIO SYSTEM AND DEVICE

(75) Inventors: Mark Weinzierl, Frisco, TX (US); Kenneth Matthew Glover, Coppell, TX (US)

(73) Assignee: Enfora, L.P., Plano, TX (US)

( * ) Notice: Subject to any disclaimer, the term of this patent is extended or adjusted under 35 U.S.C. 154(b) by 184 days.

(21) Appl. No.: 09/838,740

(22) Filed: Apr. 19, 2001

(65) Prior Publication Data

US 2001/0040561 A1 Nov. 15, 2001

Related U.S. Application Data

(63) Continuation-in-part of application No. 09/552,364, filed on Apr. 19, 2000, now abandoned.

(51) Int. Cl.
*G06F 13/12* (2006.01)
*B42F 3/00* (2006.01)

(52) U.S. Cl. .................. 710/72; 710/2; 710/8; 710/33; 710/36; 402/500

(58) Field of Classification Search .................... 710/1, 710/2, 8, 11, 12, 15, 18, 33, 62, 36
See application file for complete search history.

(56) References Cited

U.S. PATENT DOCUMENTS

| | | | | |
|---|---|---|---|---|
| 5,348,347 A * | 9/1994 | Shink | ............................. | 281/31 |
| 5,636,220 A * | 6/1997 | Vook et al. | .................. | 370/338 |
| 5,675,524 A | 10/1997 | Bernard | | |
| 5,742,905 A * | 4/1998 | Pepe et al. | ................... | 455/461 |
| 5,778,256 A * | 7/1998 | Darbee | ......................... | 710/72 |
| 5,786,921 A * | 7/1998 | Wang et al. | ................. | 398/128 |
| 5,796,394 A * | 8/1998 | Wicks et al. | ................. | 345/751 |
| 5,890,052 A * | 3/1999 | Read et al. | ............... | 455/575.3 |
| 5,941,648 A | 8/1999 | Robinson et al. | | |
| 6,009,247 A * | 12/1999 | Canora et al. | .............. | 710/100 |
| 6,175,922 B1* | 1/2001 | Wang | ......................... | 713/182 |
| 6,216,001 B1* | 4/2001 | Ghirnikar et al. | ......... | 455/435.1 |
| 6,263,209 B1* | 7/2001 | Reed et al. | ............... | 455/456.3 |
| 6,266,539 B1* | 7/2001 | Pardo | ....................... | 455/556.2 |
| 6,269,948 B1* | 8/2001 | Jackson | ...................... | 206/320 |
| 6,282,433 B1* | 8/2001 | Holshouser | .............. | 455/556.2 |
| 6,356,961 B1* | 3/2002 | Oprescu-Surcobe | ......... | 710/20 |
| 6,396,481 B1* | 5/2002 | Challa et al. | ................ | 345/169 |
| 6,571,086 B1* | 5/2003 | Uusimaki | .................... | 379/368 |
| 6,691,233 B1* | 2/2004 | Gannage et al. | ............ | 713/300 |
| 6,745,026 B1* | 6/2004 | Lortz | .......................... | 455/420 |
| 2003/0084206 A1* | 5/2003 | Floman et al. | .................. | 710/1 |

FOREIGN PATENT DOCUMENTS

EP 0571998 A1 12/1993

(Continued)

OTHER PUBLICATIONS

XP-002219052, Tools of the Trade, Strategic Finance, Nov. 2000, pp. 1-5, Montvale, NJ.
XP-002219053, Mobile Internet and Email Access with Palm, 2000 Palm, Inc., pp. 1-4.

(Continued)

*Primary Examiner*—Fritz Fleming
*Assistant Examiner*—Alan S. Chen (57) ABSTRACT

The present invention achieves technical advantages as a system (700) and device (200) that integrate the advantages of a paperless day planner portfolio with a paper-bound day planner portfolio to create a wireless day planner portfolio system (700). The system (700) generally includes an interface (410), a communication device (430) and a data entry system which may be located on a computing device (710).

26 Claims, 4 Drawing Sheets

FOREIGN PATENT DOCUMENTS

| | | |
|---|---|---|
| EP | 0580116 A2 | 1/1994 |
| EP | 0990976 A2 | 4/2000 |
| WO | WO 9709813 A1 * | 3/1997 |
| WO | WO97/22110 | 6/1997 |
| WO | WO 99/16280 | 4/1999 |
| WO | WO 9922538 A1 * | 5/1999 |
| WO | WO 9934314 A1 * | 7/1999 |
| WO | WO 9967765 A1 * | 12/1999 |

OTHER PUBLICATIONS

XP-000784003, Stajano, Jones, The Thinnest of Clients: Controlling It All Via Cellphone, Mobile Computing and Communications Review, vol. 2, No. 4, pp. 46-53.

XP-002219054, Ryan, Roddy, SSI, Seiko Instruments USA Inc. Business and Home Office Products, Jun. 2, 2000, Seiko Instruments, USA, Inc., pp. 1-3.

* cited by examiner

WIRELESS COMMUNICATION PORTFOLIO SYSTEM AND DEVICE

CROSS REFERENCE TO RELATED APPLICATIONS

This patent application is a continuation-in-part of, and claims priority from commonly assigned pending U.S. patent application Ser. No. 09/552,364 entitled Wireless Portfolio System and Device, to Weinzierl, et al., and filed on Apr. 19, 2000 now abandoned. In addition, the patent application is also related to and claims priority of commonly assigned U.S. patent application Ser. No. 09/775,327, entitled Wireless Tablet For a Personal Wireless Network, to Fillebrown, et al., and filed on Feb. 1, 2001, and is hereby incorporated by reference. Further, the patent application is also related to and claims Priority of commonly assigned U.S. Provisional Patent Application No. 60/265,478, entitled Wireless Portfolio Enhancements, to Fillebrown, et al., and filed on Jan. 31, 2001, and is hereby incorporated by reference.

TECHNICAL FIELD

The present invention relates generally to personal digital assistants (PDAs) and, more particularly, the present invention relates to systems and devices that integrate PDA technology with wireless communication technology.

STATEMENT OF A PROBLEM SOLVED BY THIS INVENTION

Some professionals prefer paper-bound day planner portfolios. Day planner portfolios, such as Day Timers®, Franklin Planners®, or Day Runners®, for example, are fixtures in practically every professional's life. In general, a Day Planner portfolio provides daily, weekly, and monthly calendars in which the professional may enter schedules or other important information. Also, day planner portfolios may provide other task management systems, such as "to-do lists", address directories, and sales tracking systems. Some day planner portfolios even include maps, prescription information, expense tracking reports, lists of holidays, business card holders, and any other information or resource that the professional wishes to have at his fingertips.

Some professionals use paperless day planner portfolios. The use of personal digital assistants (PDAs)—including portable computing devices (PCDs), Palm® devices, and Visor® devices—have become nothing short of a phenomenon. Since the introduction of PDAs in 1996, the number of users of these devices has proliferated to more than six million users (by the start of the year two thousand). As additional features and functions (such as voice recognition technology), are developed for PDAs, the use of PDAs will continue to grow.

Unfortunately, to access information in a PDA the device must first be turned on and then the user must explore a directory of information links prior to accessing that information. This is required for even the simplest and most frequently accessed information, making paper-bound day planner portfolios the day planner of choice for some tasks. In addition, PDAs may lose all of their stored data in the event of losing power, again creating another reason to not throw away paper-bound day planner portfolios.

Today's professionals demand much more from their day planner portfolios. For example, when an executive is on the road he may need to provide his administrative assistant with the ability to update his schedule independently of the executive. In addition, professionals could benefit from turning over the administration of their schedule and contact information to their administrative assistant. Moreover, it is desired to allow the executive to share the current schedule to his administrative assistant without providing assistance. Unfortunately, because the professional typically has the day planner portfolio with him, the administrative assistant cannot update or access the day planner portfolio in real time. Furthermore, it would be advantageous to be able to update and access task management systems, schedules, and other information contained in the day planner portfolio in real time.

Therefore, there exists the need for a versatile system and device that facilitates updating and keeping current, in real time, a day planner portfolio.

SELECTED OVERVIEW OF AN EMBODIMENT

The present invention achieves technical advantages as a system and a device that integrate the advantages of a paperless day planner portfolio with a paper-bound day planner portfolio to create a wireless day planner portfolio. The system generally includes an interface, a communication device, and a data entry system. One embodiment of the device more particularly provides a port enabled for a PDA, a transceiver-enabled wireless modem device, and a keyboardall contained within a portfolio. Thus implemented, the present invention provides the user or a remote user with the ability to update information in his portfolio in the background, and in real time. In addition, as the user enters data in the wireless day planner, a planner-based system is updated via a wireless connection. Furthermore, the portfolio enables the user to access paper-based information when this is more efficient.

In one embodiment, the invention is a system of providing a wireless day planner portfolio. The system includes a communication device, an interface coupled to the communication device, and a data entry system coupled to the interface. Likewise, in another embodiment, the present invention is a wireless day planner portfolio system that comprises a means for transmitting a radio signal, a means for communication coupled to the means for transmitting, and a means for data entry coupled to the means for communication.

In yet another embodiment, the present invention is a wireless day planner device. The device uses a communication device, such as a wireless modem, an interface coupled to the communication device enabled to communicate with a PDA, and a data entry system, such as a keyboard, coupled to the interface.

Other embodiments of the invention provide additional features. For example, in one embodiment, the invention is a system of providing a wireless day planner portfolio that includes a communication device, an interface coupled to the communication device, and a data entry system coupled to the interface, wherein the communication device, the interface, and the data entry system are coupled together within a portfolio. Preferably, the invention provides for wireless communication between the portfolio device and a computing device which could be maintained in a pocket or other securing means.

In still another embodiment, the invention is a thin-client wireless day planner portfolio. In this embodiment the invention includes a communication device, a processor coupled to the communication device, an interface coupled to the communication device, and a data entry system coupled to the interface. Of course, other embodiments, will be apparent to those of ordinary skill in the art upon a detailed reading of this specification in view of the appended drawings.

BRIEF DESCRIPTION OF THE DRAWINGS

Various aspects of the invention, as well as an embodiment, are better understood by reference to the following EXEMPLARY EMBODIMENT OF THE BEST MODE. To better understand the invention, the EXEMPLARY EMBODIMENT OF THE BEST MODE should be read in conjunction with the drawings in which.

AN EXEMPLARY EMBODIMENT OF THE BEST MODE

A portfolio device (portfolio) is provided that encompasses a communications device, an interface, and a data entry system coupled together within a folio or other binding. The invention provides the user with the ability to update information in a portfolio in the background, and in real time. Secondly, as the user enters data in the wireless day planner, a system located remotely from the invention is responsively updated via a wireless connection. Likewise, data entered remotely is wirelessly updated in the user's portfolio. Thirdly, the portfolio enables the user to access paper-based information when this is more efficient. Furthermore, the invention enables a user to re-charge a battery while docking a PDA with the invention. Accordingly, the invention is a system and a device that integrate the advantages of a paperless day planner portfolio with a paper-bound day planner portfolio. The system generally includes an interface, a communication device and a data entry system. One embodiment of the device more particularly provides a wireless interface enabled to communicate with a computing device, such as a PDA.

When reading this section (An Exemplary Embodiment of the Best Mode, hereinafter "exemplary embodiment"), one should keep in mind several points. First, the following exemplary embodiment is what the inventor believes to be the best mode for practicing the invention at the time this patent was filed. Thus, since one of ordinary skill in the art may recognize from the following exemplary embodiment that substantially equivalent structures or substantially equivalent acts may be used to achieve the same results in exactly the same way, or to achieve the same results in a not dissimilar way, the following exemplary embodiment should not be interpreted as limiting the invention to one embodiment.

Likewise, individual aspects (sometimes called species) of the invention are provided as examples, and, accordingly, one of ordinary skill in the art may recognize from a following exemplary structure or an exemplary act that a substantially equivalent structure or substantially equivalent act may be used to either achieve the same results in substantially the same way, or to achieve the same results in a not dissimilar way. Accordingly, the recitation of a species invokes the genus to which that species belongs as well as related species in that genus. Likewise, the recitation of a genus invokes the species known in the art. Furthermore, it is recognized that as technology develops, a number of additional ways to achieve an aspect of the invention may arise. Such advances are hereby incorporated within their respective genus should be recognized as being functionally equivalent or structurally equivalent to the aspect shown or described.

Second, aspects of the invention, including elements, acts, functions, and relationships (shown or described) should not be interpreted as being essential unless they are explicitly described and identified as being essential. The only essential aspects of the invention are identified by the claims. Third, a function or an act should be interpreted as incorporating all modes of doing that act or function, unless otherwise explicitly stated. For example, "tacking" maybe done by nailing, stapling, gluing, hot gunning, riveting, etc. Fourth, unless explicitly stated otherwise, conjunctive words (such as "or", "and", "including", and "comprising") should be interpreted in the inclusive, not the exclusive, sense. Fifth, the words "step" and "means" are provided to facilitate the reader's understanding and do not mean "means" or "step" as defined in §112, paragraph 6 of 35 U.S.C. unless used as "means for—functioning—" or "step for—functioning—" in the claims section.

Figure 1:
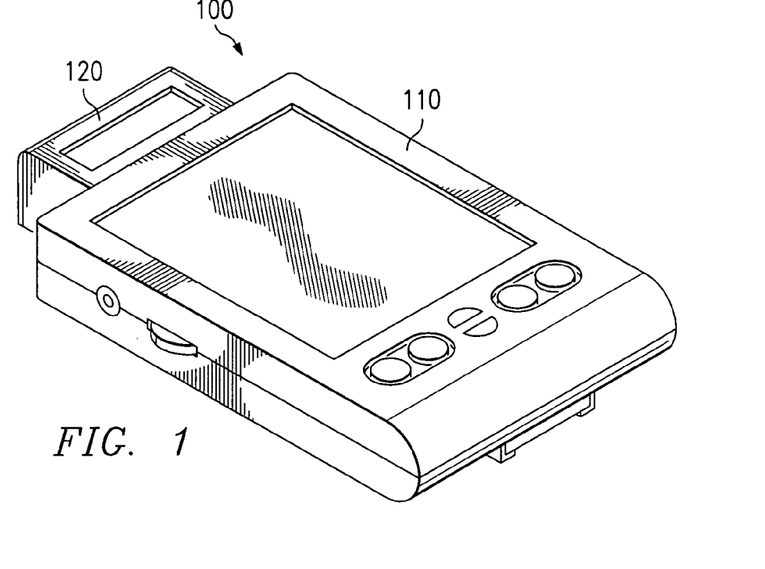
FIG. 1 illustrates a PDA having a module attached thereto.

Features, functions and other enhancements may be provided to a personal digital assistant (PDA) through the use of a module, such as a memory module or a communication module, for example. FIG. 1 illustrates a personal digital assistant 110 having an email preview module 120 attached thereto, the combination of which is depicted by reference numeral 100. Although a PDA is illustrated in FIG. 1, it should be understood that other devices in the PDA family, such as a personal computing device (PCD), or another computing device may serve the functionality of a PDA. For example, a laptop may provide similar functionality.

A PDA system generally includes hardware capable of executing machine readable instructions, software for executing acts (typically machine readable instructions) that produce the desired result, hybrids of hardware and software, and PDA subsystems. Hardware generally includes the physical PDA as well as modules that add functionality to the PDA system. In addition, hardware may include any physical device that is capable of storing machine readable instructions—such as computer memory or other data storage devices. In addition, hardware also includes things for transferring signals, such as a modem, a modem card, receivers, and transceivers, for example. Hardware also encompasses devices such as means for communicating with a PDA, including ports such as flash card ports, for example.

Figure 2:
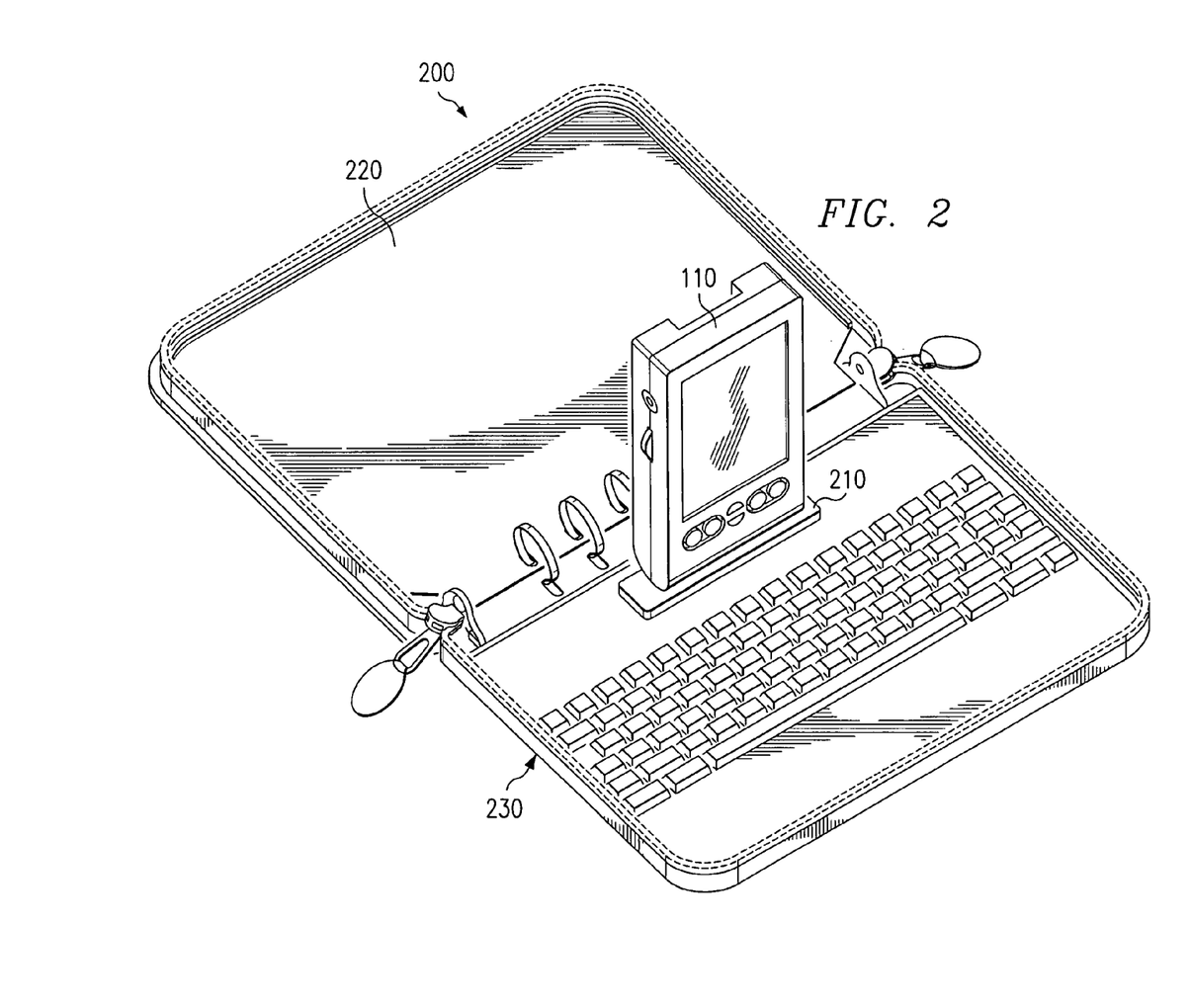
FIG. 2 shows a device configured as a wireless day planner portfolio (device)

The invention provides the ability to connect a paper-bound day planner portfolio that is wireless enabled with a paperless day planner portfolio to create a wireless day planner portfolio. FIG. 2 shows a device configured as a wireless day planner portfolio 200 (wireless day planner portfolio device). The day planner portfolio 200 shown in FIG. 2 is illustrated as being opened to a data entry system 230. In general, the wireless day planner portfolio 200 provides a day planner portfolio system (such as the one discussed below), that maybe housed inside a folio 220. The folio 220 provides a cover for papers and electrical components associated with the wireless day planner portfolio 200, as well as a binder for holding papers and a component housing insert for providing structural support for a wireless day planner portfolio system. The folio may be made of any environmentally protective material such as leather, vinyl, or plastic derivatives, for example. The data entry system 230 could be any amalgamation of devices that enable information to be entered into an attached device, such as a PDA. For example, the data entry system 230 could be a voice recognition system, but is preferably a keyboard.

Also illustrated in FIG. 2 is a device interface portal (interface portal) 210. The interface portal 210 provides access to an interface (not shown). Although the interface portal 210 shown is configured to be a PDA device interface portal, it should be understood that the interface portal 210 could also be configured to adapt to a laptop, smart phone, two way pager, or other device.

Figure 3:
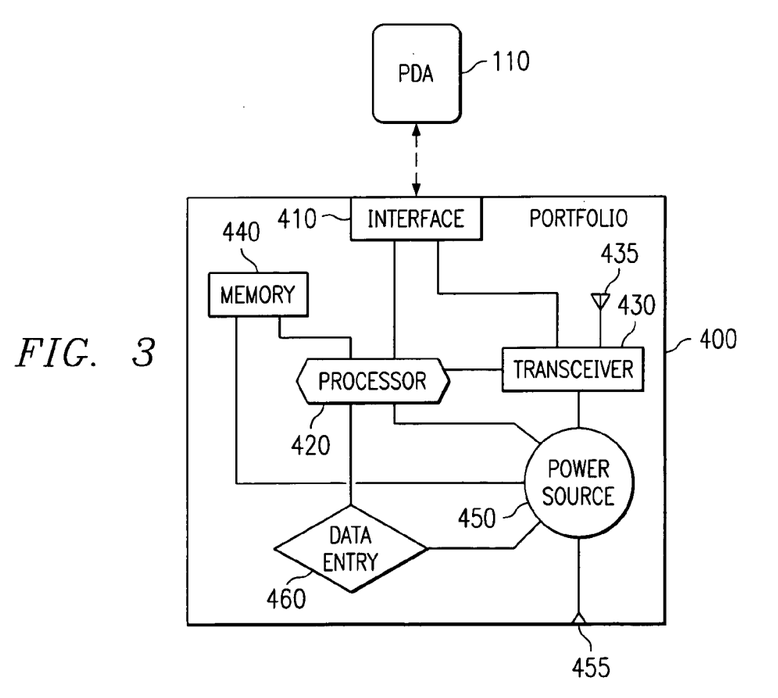
FIG. 3 illustrates a wireless day planner portfolio in communication with a PDA.

FIG. 3 illustrates a wireless day planner portfolio 400 in communication with a PDA 110. Illustrated as polygons within the wireless day planner portfolio system 400 are a plurality of subsystems. Some subsystems enable the wireless day planner portfolio system 400 to communicate with a PDA or a remote terminal, while other subsystems provide enhanced features and functionality for the wireless day planner portfolio system 400. One subsystem is a means for communicating 410 which could be an interface for connection to devices through wireline and wireless communication pathways, and is preferably a port for the PDA 110. Another subsystem is a logic 420 which could be implemented as a digital signal processor (DSP), a computer processor, or printed circuit board (PCB), for example.

Also incorporated within the wireless day planner portfolio system 400 is a means for transmitting 430 that is a transmitting device such as a receiver, a transceiver, or a spider device, for example. The means for transmitting is attached to an internal antenna 435 that is capable of sending and receiving radio communications. The wireless day planner portfolio system 400 may also incorporate a memory 440. The memory 440 could include passive/semi-permanent data storage, such as random access memory (RAM), as well as permanent data storage, such as read onlymemory (ROM). Thus, the memory 440 stores program algorithms needed to process data entered by a user or received by a means for transmitting.

In addition, it may also be desirabla to provide localized power for the wireless portfolio planner. Accordingly, a power source 450, such as a battery, for example, is built into the wireless day planner portfolio system 400. Furthermore, the power source 450 is preferably a lithium ion battery. A means for data entry 460 is provided by the wireless day plannar portfolio system 400. The means for data entry 460 may be any data entry system that enables a user to enter information into the wireless day planner portfolio system 400. For example, the means for data entry 460 is preferably a keyboard, but could also be a voice recognition system, or a touch sensitive screen, for example.

In operation, a user will attach the PDA 110 to the means for communicating 410 and enter information into the PDA 110 by interacting with the means for data entry 460. In addition, information received by the means for transmitting may be relayed to the PDA 110. Likewise, information may be uploaded to another device, or another wireless day planner portfolio, for example. In addition, a use may use the power source, or a hardwire connection 455 to the wireless day planner portfolio system to recharge the PDA 110 or whatever device is attachable to the wireless day planner portfolio.

Figure 4:
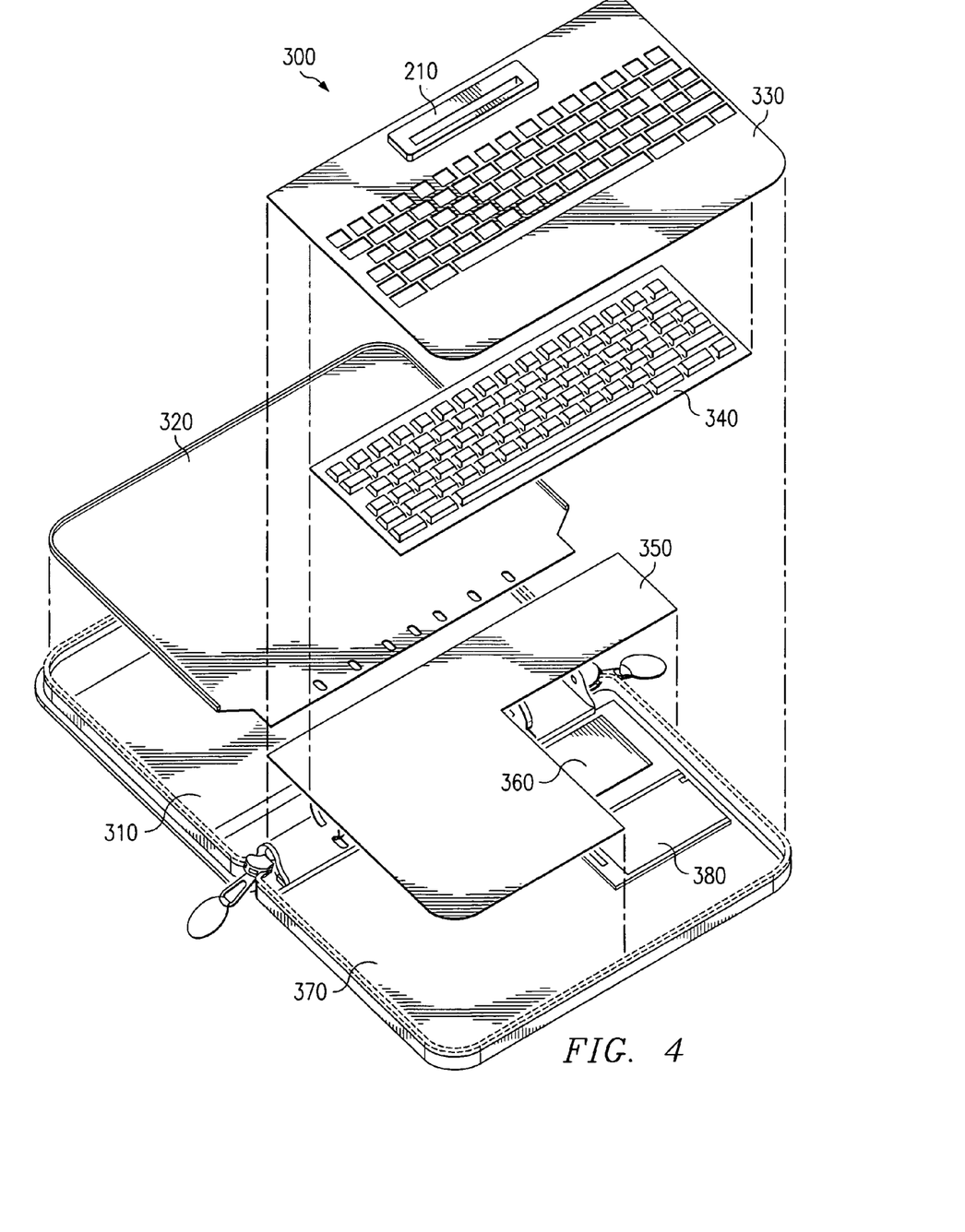
FIG. 4 is an exploded view of a wireless portfolio.

FIG. 4 is an exploded view of a wireless day planner device 300. As can be seen from FIG. 4, the wireless day planner device 300 typically includes a folio 310, a keypad protector 320, a keypad cover 330, a keypad 340, a printed circuit board (PCB) 350, a power source 360, a component housing insert 370, and a communication device 380. The folio 310 shown in FIG. 4 is illustrated as a leather binder and has disposed within it the component housing insert 370 that provides structural support and integrity for the wireless day planner portfolio system 400. The keypad cover 320 is attachable to a binder and provides protection to the wireless day planner portfolio system 400, and particularly the keypad 340. Accordingly, the keypad cover 320 is preferably made of a rigid, water resistant material.

A keypad cover 330 lays over the keypad 340 to prevent dust and other electrical contaminants from corrupting the electrical integrity of the wireless day planner portfolio system 400, and particularly the keypad 340. Accordingly, the keypad cover 330 is water resistant and fits snugly over the keypad 340. The keypad is preferably a QWERTY standard keypad, but could be any keypad used for data entry.

A PCB 350 receives data entry from the keypad 340 and provides the electrical platform for optional memory, processing, and logic devices. The PCB 350 is supported by the component housing insert 370, and is formed to accommodate a power source 360 and a means for transmitting 380.

Figures 5, 6, 7:
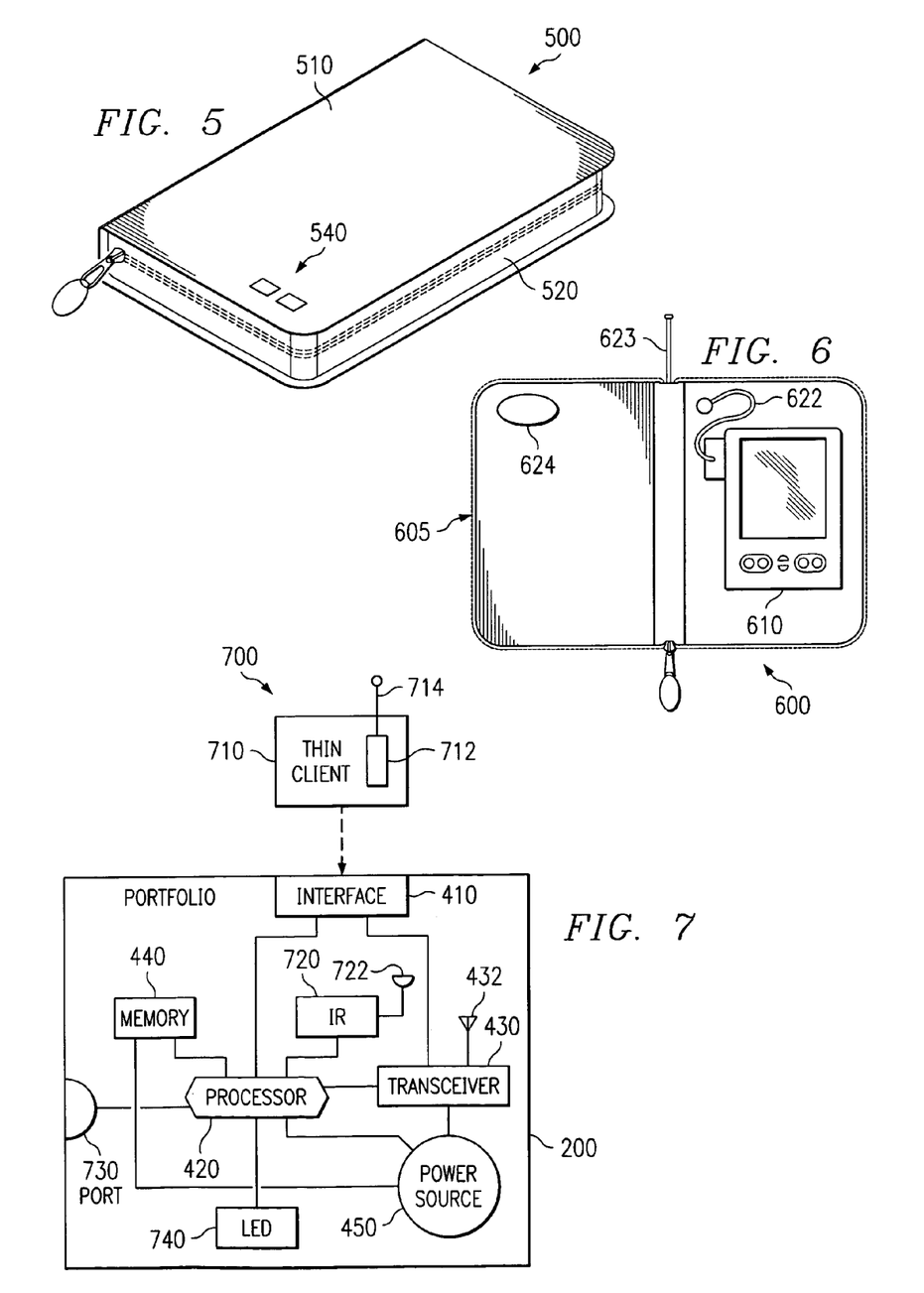
FIG. 5 shows a front-closed view of a wireless portfolio.
FIG. 6 illustrates an alternative embodiment of the wireless portfolio enabled to communicate wirelessly.
FIG. 7 is a block-diagram of a wireless portfolio configured to emphasize additional enhancements and features.

A wireless portfolio may also be configured to take advantage of wireless communications between a PDA, a thin-client, or another computing device (collectively, "computing devices"), and the wireless portfolio. FIG. 5 shows a front-closed view of a wireless portfolio 500 configured for wireless communication with a computing device. A folio 510 is shown as a foldable folio that is capable of being securely closed via a zipper 520. Located at some point on the folio 510 a plurality of light emitting diodes (LEDs) 540. Generally, the LEDs 540 provide a user the ability to monitor wireless communication status information, as discussed in greater detail below. When opened, the folio 510 may rebuild the different modes of wireless communication which it is enabled to provide.

FIG. 6 illustrates an alternative embodiment of the wireless portfolio 600 enabled to communicate wirelessly. The wireless portfolio 600 is generally encased by leather (or other attractive and ergonomic covering) that conceals a more functionally shaped, hard interior that provides the proper support structure for the wireless portfolio's electronics, power systems, communication systems, and computing device. The folio 605 includes a interface pocket 610. The interface pocket 610 is preferably a flexible, and expandable pocket that may take the shape of a number of different sized and configured computing devices, such as PDAs, or thin-clients. In addition, it is preferable for the interface pocket 610 to be removable or otherwise interchanged with other interface pockets so that to accommodate a new or different PDA or thin-client, all a user needs to do is exchange an interface pocket 610 with a second interface pocket which can accommodate the PDA or thin-client.

Preferably, the interface pocket 610 is secured to the folio 605 via velcro, a zipper, or straps, for example. Furthermore, it is preferred that the interface pocket 610 provide a user the ability to view a screen of the computing device, and allow a user the ability to interact with the computing device.

The wireless portfolio 600 provides the ability to communicate wirelessly with a remote platform, a wireless data system, or a local PDA, thin-client, or other computing device. For example, an infra-red (IR) transmitter 622 may be provided for allowing the wireless portfolio 600 to send data, voice, video, or other types of transmissions to any of the aforementioned devices. Likewise, an IR receiver 624 is also provided for allowing the wireless portfolio to receive infra-red information from any of the aforementioned devices. Similarly an antenna for wireless communication 632 is also provided. The antenna for wireless communication 632 may uplink to a wireless data system, may communicate directly with any of the aforementioned devices maintained by the wireless portfolio 600, or may communicate wirelessly to a local client or server device via a wireless local area network.

One preferred configuration of the wireless portfolio is that of a wireless portfolio enabled to support a thin-client. Accordingly, FIG. 7 is a block-diagram of a wireless portfolio 700 configured to emphasize additional optional enhancements and features that may be associated with a thin-client, PDA, or other device. The wireless portfolio 700 includes a folio 200 which may be any of the aforementioned folio devices, or simply any ergonomic device enabled to maintain the electronics shown, a PDA, thin-client or other device. Similarly, the folio 200 may be configured to hold pads of paper, electronic writing detection tablets, pockets for holding change, keys, credit cards, or any other accessories.

One enhancement provided by the folio 200 is an infra-red capability shown in FIG. 7 as being enabled by IR chip 720. The IR chip 720 provides the wireless portfolio 700 with the transmission and reception protocols needed to enable infrared communications. An IR transmitter-receiver 722 is coupled to the IR chip 720 and provides the physical production of infra-red signaling as well as the ability to convert received infra-red signals into electronic pulses needed for processing by the processor 420 or the IR chip 720. Preferably, the IR transmitter-receiver 722 is allowed to protrude slightly away from the folio 200 via a wire or other means so that the IR transmitter-receiver 722 may be directed toward the source or destination of IR transmissions. Also, the IR transmitter-receiver 722 may be split into a separate IR transmitter, and IR receiver.

Additional communication capabilities are provided to the folio 200 by a data port 730. The data port 730 is for providing wire based data communications with a client or server. Accordingly, the port 730 may be a serial port, a parallel port, or a hybrid-type port device, such as a SPLIT-BRIDGE TM. Typically, the port 730 is coupled to a processor 420.

The processor 420 of the folio 200 is enabled to support local communication protocols, such as blue tooth, wireless wide area network (WAN), or wireless local area network (LAN), for example. In addition, the processor 420 may be enabled to support global positioning system (GPS) signals to provide location information for a user. Alternatively, GPS information may be provided via a separate GPS chip placed within the folio 200 (although such a separate GPS chip is not illustrated in FIG. 7, such a chip would be preferably coupled to the processor 420).

Also coupled to the processor are a plurality of light-emitting diodes (LEDs) 740. The LEDs 740 show to a user information regarding the wireless portfolio, such as the status of wireless communications. For example, a first LED may show the status of wireless communication with a wireless communication network such as a CDMA, TDMA, GSM, 3G, 4G, or other similar wireless network. Such information may include indications of strength of transmission, speed of transmission, quality of transmission, or whether information is being downloaded to the computing device or being uploaded from the computing device. In a preferred embodiment, the invention uses LEDs to show a user that certain levels of service commensurate with a wireless network use agreement are being met by the wireless network provider. Similarly, a second LED may show the status of wireless communication with an IR device. Likewise, a third LED may show the status of wireless communication with a local device maintained within the folio 200, such as a PDA, a thin-client, or other device. Of course, other LEDs may be provided to show other types of status information including various stages of communication with a single or multiple wireless communications.

The folio 200 maintains a transceiver 430 having a wireless antenna 432. The wireless antenna 432 may provide the ability to communicate wirelessly with a local network, or with a local device maintained by an interface 410. The interface 410 is preferably a pocket, and although the interface 410 may include a port for connection to a PDA or a thin-client, preferably the interface 410 merely provides physical structural support for maintaining the PDA or thin-client within the folio in a reliable manner. Accordingly, the wireless antenna 432 enables wireless communication with a thin-client 710 or PDA, or other device. Preferably, the thin-client 710 maintains a transceiver 712 which is coupled to an antenna for wireless communication 714. Preferably, the wireless portfolio computing device uses a palm-based operating system or a windows "CE" operating system (or some varient of these). However, it should be noted that the invention could be implemented using any operating system. Preferably, the computing device is a thin client that is enabled to support an IRDA Infra Red Data Association IR Comm Protocol, a Blue Tooth protocol, or a varient of the IEEE 802.11 or 802.11b radio protocols. Optionally, a plurality of available protocols could be supported on a single platform.

The transceiver 712 is enabled to transceive audio, video, data, or other information via the antenna for wireless communication 714. Furthermore, in practice, the antenna for wireless communication 714 communicates with the electronics of the wireless portfolio 700 via the wireless antenna 432. Of course, other thin-client embodiments are possible.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

We claim:

1. A day planner portfolio comprising:
   a folio, the folio comprising,
      a first cover and a second cover, the folio operable for housing one or more items between the first cover and the second cover, the folio further comprising,
      a component housing insert for providing structural support, and
   a binder for holding paper; and
   a wireless day planner portfolio system housed within the folio, the wireless day planner portfolio system comprising,
      an interface operable for communicating with a personal computing device (PCD), and
      a wireless transceiver coupled to the interface and operable for communicating wirelessly with a remote communications device wherein the interface and wireless transceiver are integrated into the folio.

2. The portfolio in accordance with claim 1 wherein the wireless day planner portfolio system further comprises a battery for providing power and means for providing power via the interface to the PCD.

3. The portfolio in accordance with claim 1 wherein the wireless day planner portfolio system further comprises:
a processor;
memory; and
a data entry system coupled to the interface.

4. The portfolio in accordance with claim 1 wherein the interface further comprises a second wireless transceiver for enabling wireless communication with the PCD.

5. The portfolio in accordance with claim 4 wherein the second wireless transceiver comprises an infrared transceiver.

6. The portfolio in accordance with claim 1 wherein the folio comprises a removable pocket configured to receive the PCD.

7. The portfolio in accordance with claim 1 wherein the wireless day planner portfolio system further comprises,
a processor,
memory, and
a data entry system coupled to the interface; and
wherein the folio is foldable and capable of being securely closed.

8. The portfolio in accordance with claim 1 wherein the wireless day planner portfolio system further comprises another wireless transceiver coupled to the interface and operable for communicating wirelessly with a nearby communications device.

9. The portfolio in accordance with claim 1 wherein the wireless day planner portfolio system further comprises a data port for providing wired communication with an external data device.

10. A day planner portfolio comprising:
a folio having a first cover and a second cover, the folio operable for housing one or more items between the first cover and the second cover, the folio further comprising,
a component housing insert for providing structural support, and
a binder for holding paper; and
a wireless day planner portfolio system housed within the folio, the wireless day planner portfolio system comprising,
interfacing means for communicating with a personal computing device (PCD), and
communicating means coupled to the interfacing means for communicating
wirelessly with a remote communications device wherein the interfacing means and communicating means are integrated into the folio.

11. The portfolio in accordance with claim 10 wherein the wireless day planner portfolio system further comprises;
a processor;
memory; and
a data entry system coupled to the interface.

12. The portfolio in accordance with claim 10 wherein the folio comprises a removable pocket configured to receive the PCD.

13. The portfolio in accordance with claim 10 wherein the communicating means comprises:
a wireless transceiver; and
an antenna.

14. The portfolio in accordance with claim 13 wherein the wireless day planner portfolio system further comprises:
a power source; and
a data entry system coupled to the interface, the data entry system including a keypad.

15. The portfolio in accordance with claim 13 wherein the interfacing means for communicating includes a second wireless transceiver.

16. The portfolio in accordance with claim 5 wherein the second wireless transceiver comprises an infrared transceiver.

17. A day planner portfolio comprising:
a folio having a first cover and a second cover and operable for housing a plurality of items therein, the plurality of items comprising,
a removable pocket configured to receive a personal computing device (PCD),
a component housing insert for providing structural support,
a power source;
a keypad;
a printed circuit board including a processor;
a communications interface for communicating with the PCD, and
a first wireless transceiver for communicating wirelessly with a remote communications device wherein the communications interface and wireless transceiver are integrated into the folio.

18. The portfolio in accordance with claim 17 wherein the first wireless transceiver, communications interface and the processor function to provide communications between the PCD and the remote communications device via the folio.

19. The portfolio in accordance with claim 17 wherein the communications interface comprises a second wireless transceiver, and wherein the first wireless transceiver, the second wireless transceiver and the processor function to provide wireless communications between the PCD and the remote communications device via the folio.

20. The portfolio in accordance with claim 19 wherein the second wireless transceiver comprises an infrared transceiver.

21. A day planner portfolio comprising a folio, the folio comprising:
a receptacle for holding a personal computing device (PCD) that is equipped for wireless communication, the receptacle including a physical interface operable for interfacing electrically with an interface of the PCD;
means for receiving data from a remote communications device; and
a wireless transceiver coupled to the receiving means and operable for communicating the data to the PCD wherein the receptacle and wireless transceiver are integrated into the folio.

22. The portfolio in accordance with claim 21 wherein the folio further comprises a data port coupled to the receiving means.

23. The portfolio in accordance with claim 21 wherein the folio further comprises a keypad coupled to the receiving means.

24. The portfolio in accordance with claim 21 wherein the receptacle is a removable pocket.

25. The portfolio in accordance with claim 21 wherein the data is communicated to the PCD in accordance with a one of an Infra Red communications protocol, a Blue Tooth communications protocol and an IEEE 802.11 communications protocol.

26. The portfolio in accordance with claim 21 wherein the means for receiving data from a remote communications device comprises a second wireless transceiver.

* * * * *